(12) United States Patent
Rupp et al.

(10) Patent No.: US 9,169,804 B2
(45) Date of Patent: Oct. 27, 2015

(54) DUCT AND METHOD FOR DAMPING PRESSURE WAVES CAUSED BY THERMOACOUSTIC INSTABILITY

(71) Applicant: ROLLS-ROYCE PLC, London (GB)

(72) Inventors: Jochen Rupp, Burton-on-Trent (GB); Anthony John Moran, Nuneaton (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 14/314,821

(22) Filed: Jun. 25, 2014

(65) Prior Publication Data

US 2015/0021117 A1 Jan. 22, 2015

(30) Foreign Application Priority Data

Jul. 18, 2013 (GB) .................................. 1312840.0

(51) Int. Cl.
*F02K 1/00* (2006.01)
*F02K 1/34* (2006.01)
*F23R 3/00* (2006.01)

(52) U.S. Cl.
CPC . *F02K 1/34* (2013.01); *F23R 3/002* (2013.01); *F23R 2900/00014* (2013.01)

(58) Field of Classification Search
CPC .................................. F02K 1/00; F02K 1/827
USPC ........................................................ 181/213
See application file for complete search history.

(56) References Cited

U.S. PATENT DOCUMENTS

| | | | |
|---|---|---|---|
| 5,685,157 A | 11/1997 | Pandalai et al. | |
| 8,684,130 B1 * | 4/2014 | Bothien et al. | 181/213 |
| 8,770,339 B2 * | 7/2014 | Starobinski et al. | 181/213 |
| 2002/0108810 A1 * | 8/2002 | Kudernatsch | 181/224 |
| 2005/0106519 A1 * | 5/2005 | Flohr et al. | 431/114 |
| 2011/0138812 A1 * | 6/2011 | Johnson | 60/725 |
| 2011/0220433 A1 * | 9/2011 | Nakamura et al. | 181/213 |
| 2011/0308630 A1 * | 12/2011 | Huber et al. | 137/14 |
| 2013/0206500 A1 * | 8/2013 | Ono et al. | 181/213 |
| 2013/0283799 A1 * | 10/2013 | Carey et al. | 60/725 |

FOREIGN PATENT DOCUMENTS

| | | |
|---|---|---|
| DE | 10 2006 053 278 A1 | 5/2008 |
| EP | 1 669 670 A1 | 6/2006 |
| EP | 1 918 642 A2 | 5/2008 |
| EP | 1918642 A2 * | 5/2008 ............. F23M 99/00 |
| EP | 2 397 761 A1 | 12/2011 |

(Continued)

OTHER PUBLICATIONS

Nov. 11, 2014 Search Report issued in European Application No. 14 17 3950.

(Continued)

*Primary Examiner* — Forrest M Phillips

(74) *Attorney, Agent, or Firm* — Oliff PLC

(57) ABSTRACT

A duct and a method for damping pressure waves caused by thermoacoustic instability, the duct comprising: a locking Helmholtz resonator positioned on the circumference of the duct, the locking Helmholtz resonator tuned to a first frequency; and one or more damping Helmholtz resonators positioned on the circumference of the duct at or adjacent to 90 and/or 270 degrees from the locking Helmholtz resonator, wherein the damping Helmholtz resonators are tuned to a second frequency which is different from the first frequency of the locking Helmholtz resonator.

17 Claims, 3 Drawing Sheets

(56) References Cited

FOREIGN PATENT DOCUMENTS

| | | |
|---|---|---|
| GB | 2 288 660 A | 10/1995 |
| JP | A-2005-48992 | 2/2005 |

OTHER PUBLICATIONS

Search Report issued in British Patent Application No. GB1312840.0 dated Dec. 23, 2013.

* cited by examiner

DUCT AND METHOD FOR DAMPING PRESSURE WAVES CAUSED BY THERMOACOUSTIC INSTABILITY

The present invention relates to a duct having Helmholtz resonators configured to damp pressure waves caused by thermoacoustic instability and a related method, and particularly but not exclusively to their application in an annular combustor of a gas turbine engine.

BACKGROUND

Environmental factors are a key driver in the progression of the aerospace industry. Such factors have resulted in the continual development of gas turbine engines to produce higher power and lower emissions.

Lean-burn combustors, which have low NOx emissions, have been developed for gas turbine engines. These lean-burn combustors operate by increasing the flow of air into the combustor such that the fuel to air ratio is below the level at which NOx is formed. Furthermore, the fuel is burnt at a lower temperature, again reducing the formation of NOx. However, these conditions are also conducive to the occurrence of thermoacoustic instabilities within the combustor. Such instabilities create pressure waves which cause vibration in the gas turbine engine producing undesirable noise and further may result in mechanical failures.

To reduce thermoacoustic instabilities it is known to use Helmholtz resonators. A Helmholtz resonator is a hollow container, typically a sphere, with a neck having an open hole. When air is forced into the container, the pressure inside increases. When the external force pushing the air into the container is removed, the higher-pressure air inside will flow out of the container. However, the inertia of the body of air in the neck causes the pressure in the container to be reduced below the ambient pressure, thus causing the body of air to be drawn back into the container. The body of air oscillates into and out of the container with decreasing amplitude. The amplitude of the oscillation is greatest at the resonant frequency of the Helmholtz resonator.

In our published European patent application EP1669670A1 various Helmholtz resonators have been placed around the circumference of the combustor as for example shown for the inner annulus in FIG. 1. The annular combustion chamber 10 composes an inner annulus 2 and an outer annulus 4. The inner annulus 2 comprises seven Helmholtz resonators 6 spaced around the circumference of the inner annulus 2. A similar distribution of Helmholtz resonators 6 connected to the combustion chamber could be placed within the outer annulus 4.

The thermoacoustic instability in annular combustion chambers creates a pressure wave which spins circumferentially through the combustion chamber. A Helmholtz resonator tuned to the frequency of the wave creates an acoustic node (zero pressure fluctuation) at the circumferential position of the Helmholtz resonator. Consequently, the spinning mode shape is locked in position and a standing wave is present with known positions of anti-nodes (points where the pressure fluctuation is at its maximum).

Thermoacoustic instabilities may arise at different stages in the gas turbine engine operating, range. As the conditions in the combustion chamber (for example temperature) vary during the engine operating range, the frequency of the pressure wave also varies. To account for this, several, groups of the Helmholtz resonators 6 are tuned to different frequencies. This can lead to a large number of Helmholtz resonators at various frequencies around the combustion chamber.

The maximum absorption of a resonator is obtained when it is located at a pressure anti-node. Conversely, no damping is provided at pressure nodes. The Helmholtz resonators 6 are therefore arranged so that additional resonators of the same frequency tuning are included at 90 degree and 270 degree spacing from the Helmholtz resonator 6 which defines the node of the pressure wave. This ensures that all Helmholtz resonators apart from one are located in the vicinity of the anti-nodes to maximise damping efficiency.

However, by distributing additional Helmholtz resonators tuned to the same frequency around the circumference of the combustion chamber it is not known a priori which Helmholtz resonator generates the pressure node by locking the spinning wave, since the position of the node could be at any of the Helmholtz resonator positions. This can lead to a compromise in positioning the Helmholtz resonators and hence a reduction in damping. Furthermore, by using a large quantity of Helmholtz resonators the position of each of the Helmholtz resonators is compromised since not all Helmholtz resonators are located in the direct vicinity of the pressure anti-node. This reduces the amount of acoustic damping provided by the Helmholtz resonators. In addition, the large number of Helmholtz resonators adds weight to the combustion chamber. Moreover, space constraints may not allow the installation of large quantities of Helmholtz resonators on the combustion chamber due to their blockage of the external air flow.

The present invention provides a duct with a Helmholtz resonator configuration which overcomes sonic or all of the above identified problems.

STATEMENTS OF INVENTION

In accordance with an aspect of the invention there is provided a duct comprising: a locking Helmholtz resonator positioned, on a circumference of the duct, the locking Helmholtz resonator tuned to a first frequency; and one or more damping Helmholtz resonators positioned on the circumference of the duct at 90 and/or 270 degrees from the locking Helmholtz resonator or one or more damping Helmholtz resonators positioned on the circumference of the duct adjacent to 90 and/or 270 degrees from the locking Helmholtz resonator and the one or more damping Helmholtz resonators adjacent to 90 and/or 270 degrees from the locking Helmholtz resonator comprise as pair of damping Helmholtz resonators positioned either side of 90 degrees and/or a pair of damping Helmholtz resonators positioned either side of 270 degrees, wherein the damping Helmholtz resonators are tuned to a second frequency which is different from the first frequency of the locking Helmholtz resonator.

The duct may be cylindrical or annular.

By using damping Helmholtz resonators which are tuned to a different frequency from that of the locking Helmholtz resonator, a pressure wave of the first frequency will only be locked by the locking Helmholtz resonator and damped by the damping Helmholtz resonator.

The second frequency may be lower or higher than the first frequency.

The damping Helmholtz resonators may have a volume which is different from a volume of the locking Helmholtz resonator.

The neck diameter of the damping Helmholtz resonator ma be different from the neck diameter of the locking Helmholtz resonator.

The neck length of the damping Helmholtz resonator may be different from the neck length or the damping Helmholtz resonator.

The resonance frequency of the damping Helmholtz resonators may be approximately 10% larger or smaller than for the locking Helmholtz resonator. Moreover the loss of absorption due to the mistuning could be compensated with it neck area increase which would increase the amount of absorption. This ensures that damping is maximised and that the resonant frequency of the damping Helmholtz resonators is sufficiently close to the resonant frequency of the locking Helmholtz resonator.

The duct may further comprise one or more additional locking Helmholtz resonators.

The one or more additional locking Helmholtz resonators may be tuned to the first frequency.

The one or more additional locking Helmholtz resonators may be tuned to frequencies which are different from the first frequency. This may allow the locking Helmholtz resonators to lock pressure waves of different frequencies.

Any of the Helmholtz resonators may be of an adjustable nature such that their resonant frequency can be varied in use. For example, the Helmholtz resonators may have a variable volume. This allows the Helmholtz resonators to lock and/or damp pressure waves of different frequency.

The frequencies of the one or more additional locking Helmholtz resonators may be different from the second frequency. This may allow one or more locking Helmholtz resonators to use the same damping Helmholtz resonators. Alternatively each locking Helmholtz resonator may use one or more damping Helmholtz resonators designated specifically for that locking Helmholtz resonator.

The one or more additional locking Helmholtz resonators may be positioned on the circumference of the duct at or adjacent to 180 degrees from the locking Helmholtz resonator.

An additional locking Helmholtz resonator may be positioned on the circumference of the duct at 180 degrees from the locking Helmholtz resonator. Both locking Helmholtz resonators may be tuned to the same frequency. This may ensure that nodes of a pressure wave are located at the locking Helmholtz resonators.

The duct ma be an annular combustion chamber for a turbomachine, e.g. a gas turbine engine, or an industrial furnace or a boiler.

In accordance with another aspect of the invention there is provided a method of damping pressure waves in a duct caused by thermoacoustic instability, the method comprising: positioning a locking Helmholtz resonator on the circumference of the duct, the locking Helmholtz resonator tuned to a first frequency; and positioning one or more damping Helmholtz resonators on the circumference of the duct at 90 and/or 270 degrees from the locking Helmholtz resonator or positioning one or more damping Helmholtz resonators on the circumference of the duct adjacent to 90 and/or 270 degrees from the locking Helmholtz resonator and the one or more damping Helmholtz resonators adjacent to 90 and/or 270 degrees from the locking Helmholtz resonator comprise, a pair of damping Helmholtz resonators positioned either side of 90 degrees and or a pair of damping Helmholtz resonators positioned either side of 270 degrees, wherein the damping Helmholtz resonators rare tuned to a second frequency which is different from the first frequency of the locking Helmholtz resonator.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION

Figure 5:
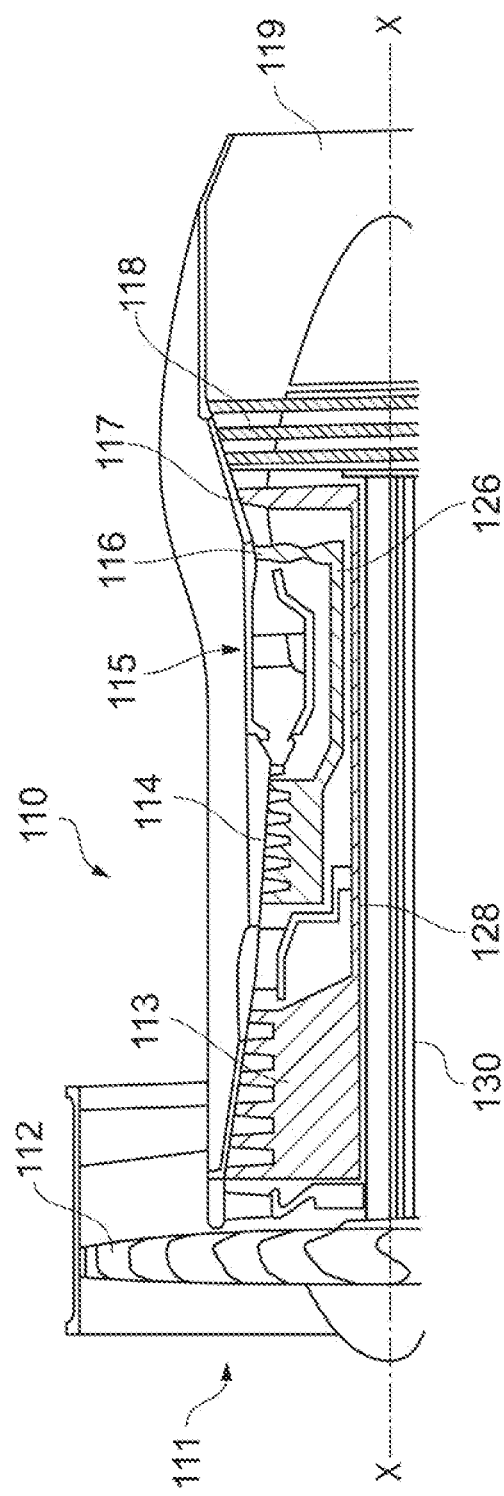
FIG. 5 is partially cut away view of a turbofan gas turbine engine having a duct according to the present invention.

A turbofan gas turbine engine 110, as shown in FIG. 5, comprises in flow series an intake 111, a fan 112, an intermediate pressure compressor 113, a high pressure compressor 114, a combustion chamber 115, a high pressure turbine 116, an intermediate pressure turbine 117, a low pressure turbine 118 and an exhaust 119. The high pressure turbine 116 is arranged to drive the high pressure compressor 114 via a first shaft 126. The intermediate pressure turbine 117 is arranged to drive the intermediate pressure compressor 113 via a second shaft 128 and the low pressure turbine 118 is arranged to drive the fan 112 via a third shaft 130. In operation air flows into the intake 111 and is compressed by the fan 112. A first portion of the air flows through, and is compressed by, the intermediate pressure compressor 113 and the high pressure compressor 114 and is supplied to the combustion chamber 115. Fuel is injected into the combustion chamber 115 and is burnt in the air to produce hot exhaust gases which flow through, and drive, the high pressure turbine 116, the intermediate pressure turbine 117 and the low pressure turbine 118. The hot exhaust gases leaving the low pressure turbine 118 flow through the exhaust 119 to provide propulsive thrust. A second portion of the air bypasses the main engine to provide propulsive thrust.

Figure 2:
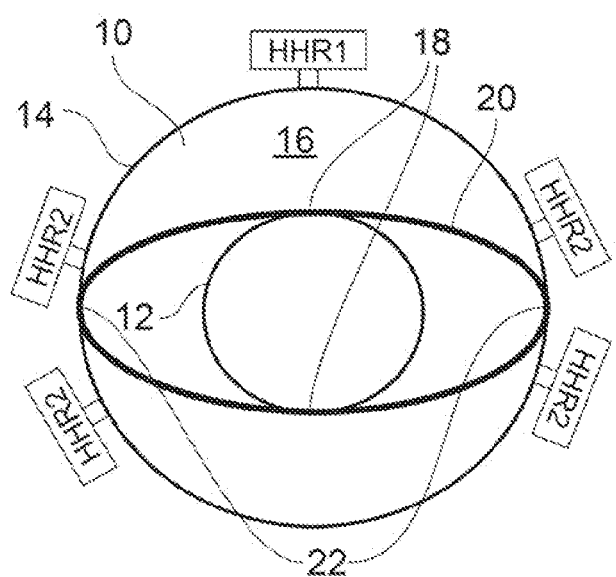
FIG. 2 is a cross-sectional schematic view of a duct having a Helmholtz resonator configuration in accordance with an embodiment of the invention.

FIG. 2 shows an annular duct 10 having a Helmholtz resonator configuration in accordance with an embodiment of the invention. The annular duct 10 comprises an inner wall 12 and an outer wall 14. The inner wall 12 and outer wall 14 are concentric with the outer will 14 having a larger diameter than the inner wall 12, thus defining a cavity 16 between the inner wall 12 and outer wall 14.

A locking Helmholtz resonator HHR1 is positioned on the circumference of the outer wall 14. Further damping Helmholtz resonators HHR2 are positioned on the circumference of the outer wall 14 circumferentially spaced from the locking Helmholtz resonator HHR1. A pair of those damping Helmholtz resonators HHR2 are located either side, at both sides, of 90 degrees from the locking Helmholtz resonator HHR1. Similarly, a further pair of damping Helmholtz resonators HHR2 are located either side, at both sides, of 270 degrees from the locking Helmholtz resonator HHR1.

The locking Helmholtz resonator HHR1 is tuned to a first frequency. The damping Helmholtz resonators HHR2 are tuned to a second frequency which is different from the frequency of the locking Helmholtz resonator HHR1. This is achieved by using Helmholtz resonators which have a different volume. However the different frequencies may be achieved by changing the neck area or neck length of the Helmholtz resonators. Specifically, the damping Helmholtz resonators HHR2 have a resonance frequency which is approximately 10% smaller, or larger, than the locking Helmholtz resonator HHR1.

In use, the annular duct 10 experiences thermoacoustic instability which creates a pressure wave that spins circumferentially through the annular duct 10. The pressure wave has a frequency which is approximately equal to the first frequency, to which the locking Helmholtz resonator HHR1 is tuned. Therefore, a node 18 is created at the circumferential position of the locking Helmholtz resonator HHR1. Consequently, the spinning mode shape is locked in position and a standing wave 20 is present with its anti-nodes 22 located at 90 degrees and 270 degrees from the locking Helmholtz resonator HHR1. Therefore, the anti-nodes 22 fall between the pairs of damping Helmholtz resonators HHR2 located either side, both sides, of 90 degrees and either side, both sides, of 270 degrees from the locking Helmholtz resonator HHR1.

The resonance frequency of the damping Helmholtz resonators may be approximately 10% larger or smaller than for the locking Helmholtz resonator. Moreover the loss of absorption due to the mistuning could be compensated with a neck area increase which would increase the amount of absorption. This ensures that damping is maximised and that the resonant frequency of the damping Helmholtz resonators is sufficiently close to the resonant frequency of the locking Helmholtz resonator.

As the locking Helmholtz resonator HHR1 is tuned to the frequency of the pressure wave and the damping Helmholtz resonators HHR2 are tuned to a slightly different frequency, the node 18 of the standing wave 20 is always at the position of the locking Helmholtz resonator HHR1. This allows the damping Helmholtz resonators HHR2 to be more accurately positioned at the anti-nodes 22 of the standing wave 20.

Figure 1:
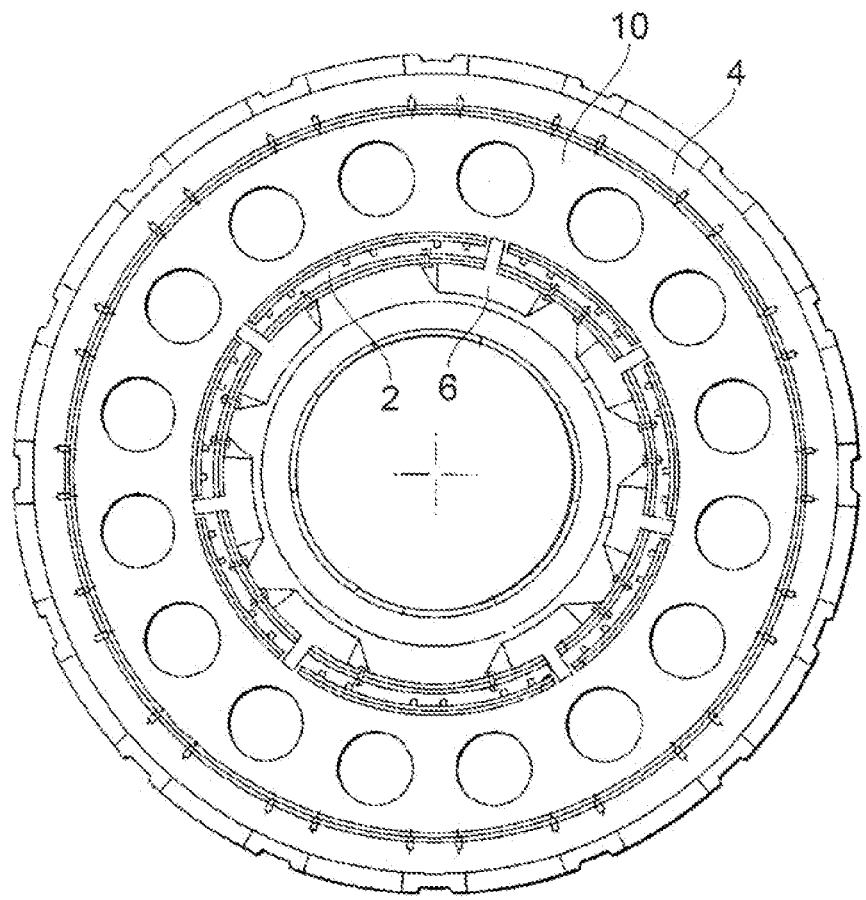
FIG. 1 is a cross-sectional view of a prior an Helmholtz resonator configuration used in an inner annulus of an annular combustion chamber.
Figure 3:
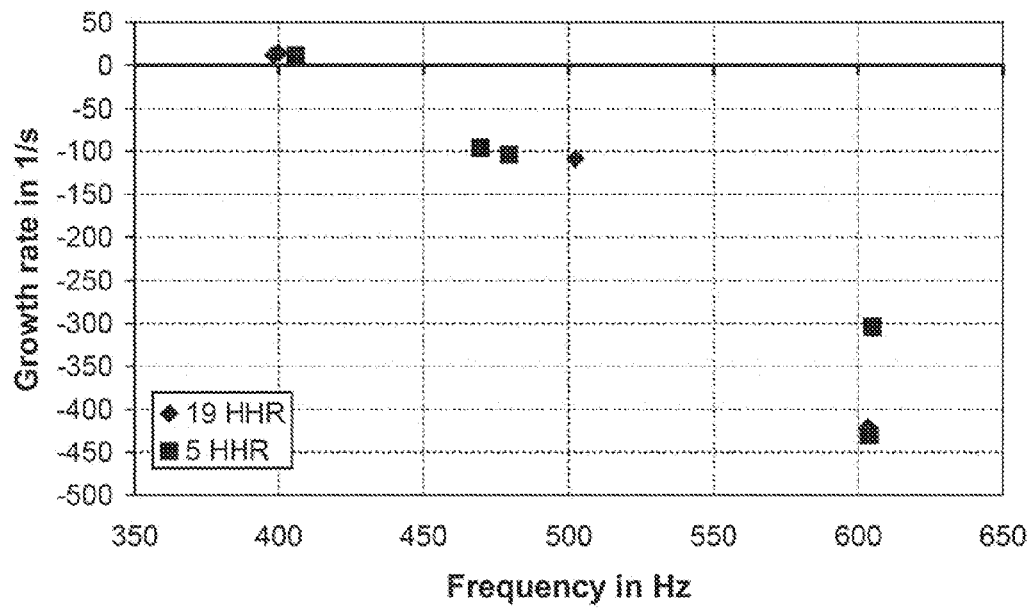
FIG. 3 is a graph of growth rate against frequency for both the prior art Helmholtz resonator configuration similar to FIG. 1 and the Helmholtz resonator configuration of the present invention shown in FIG. 2.

FIG. 3 shows a graph of growth rate against frequency for both the prior art Helmholtz resonator configuration shown in FIG. 1 and the Helmholtz resonator configuration of the present invention shown in FIG. 2. Here, a positive growth rate indicates an unstable system and the occurrence of undesirable pressure amplitudes. As shown in FIG. 3, the Helmholtz resonator configuration of the present invention has almost identical growth rates for the shown frequency range when compared with the prior art configuration.

The prior art configuration used nineteen Helmholtz resonators. The present invention achieves comparable results with only five Helmholtz resonators. The present invention therefore provides a lighter and simpler means of damping thermoacoustic instabilities.

In alternative embodiments, the locking Helmholtz resonator HHR1 and damping Helmholtz resonators HHR2 could be tuned to different frequencies by adjusting the length of the neck of the Helmholtz resonator, by adjustment of the internal temperature of the Helmholtz resonator (see for example GB2288660A, the disclosures of which are incorporated by reference), etc. Also, where the volume of the Helmholtz resonators is controlled, the volume of the damping Helmholtz resonators HHR2 may be approximately 10% smaller than the volume of the locking Helmholtz resonator. Furthermore, other relative volumes could be used with desirable results.

Furthermore, the resonant frequencies of the locking Helmholtz resonator HHR1 and/or damping Helmholtz resonators could be controllable during operation. This would allow the Helmholtz resonators to be adapted to suit the current operating conditions.

Figure 4:
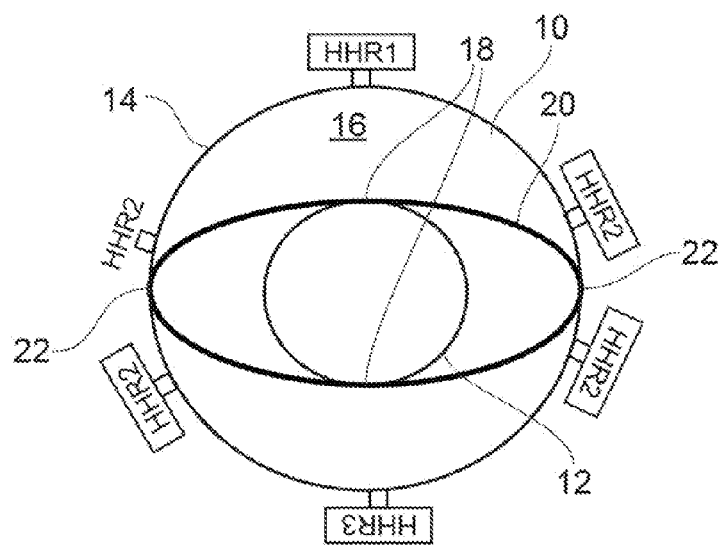
FIG. 4 is a cross-sectional schematic view of a duct having a Helmholtz resonator configuration in accordance with another embodiment of the invention.

FIG. 4 shows an annular duct 10 having a Helmholtz resonator configuration in accordance with another embodiment of the invention. In this embodiment a second locking Helmholtz resonator HHR3 is provided on the circumference of the outer wall 14. The second locking Helmholtz resonator HHR3 is positioned at 180 degrees from the locking Helmholtz resonator HHR1.

The second locking Helmholtz resonator HHR3 is tuned to the same frequency as the locking Helmholtz resonator HHR1. Therefore, the second locking Helmholtz resonator HHR3 ensures that the nodes 18 of the standing wave 20 are located at the locking Helmholtz resonators HHR1 and HHR3.

Alternatively, the second Helmholtz resonator HHR3 could be tuned to a third frequency which is not equal to the first and second frequencies of the locking Helmholtz resonator HHR1 and damping Helmholtz resonators HHR2. This therefore allows a pressure wave of frequency equal to the first or third frequencies to be locked by the locking Helmholtz resonator HHR1 or second locking Helmholtz resonator HHR3 respectively. The damping of such waves can be carried out by the damping Helmholtz resonators. For example, the Helmholtz resonators may be configured so that the damping Helmholtz resonators HHR2 have a 10% larger volume than the locking Helmholtz resonator HHR1 and a 10% smaller volume than the second locking Helmholtz resonator HHR3.

To increase the functionality further, additional locking Helmholtz resonators can be used which are tuned to additional frequencies. Where significant temperature variations are experienced, the locking Helmholtz resonator HHR1 may not be able to lock the pressure wave as a consequence of the resulting frequency change. The additional locking Helmholtz resonators allow such frequency variations to be captured. The additional locking Helmholtz resonators are spaced around the circumference of the outer wall 14. Therefore additional damping Helmholtz resonators are provided in a corresponding position as the damping Helmholtz resonators HHR2, such that they are located at the anti-node of the standing wave.

In an alternative arrangement one or more damping Helmholtz resonators may be positioned on the circumference of the duct at 90 and/or 270 degrees from the locking Helmholtz resonator.

The present invention can be used in any annular combustor, industrial furnace or boiler with cylindrical or ring geometry. Furthermore, the invention can be used in any cylindrical or annular duct affected by acoustic resonances. The annular duct 10 may be an annular combustion chamber 115 shown in FIG. 5. The duct may be a cylindrical duct and may be a tubular combustion chamber.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

The invention claimed is:
1. A duct comprising:
a locking Helmholtz resonator positioned on a circumference of the duct, the locking Helmholtz resonator being tuned to a first frequency; and
one or more damping Helmholtz resonators tuned to a second frequency different from the first frequency of the locking Helmholtz resonator, the one or more damping Helmholtz resonators being positioned on the circumference of the duct:

at 90 degrees and/or 270 degrees from the locking Helmholtz resonator, or adjacent to 90 degrees and/or 270 degrees from the locking Helmholtz resonator, the one or more damping Helmholtz resonators being adjacent to 90 degrees and/or 270 degrees from the locking Helmholtz resonator include: (i) a pair of damping Helmholtz resonators positioned at either side of 90 degrees, and/or (ii) a pair of damping Helmholtz resonators positioned at either side of 270 degrees.

2. The duct as claimed in claim 1, wherein the second frequency is lower, or higher, than the first frequency.

3. The duct as claimed in claim 1, wherein the damping Helmholtz resonators have a volume which is different from a volume of the locking Helmholtz resonator.

4. The duct as claimed in claim 1, wherein the damping Helmholtz resonators have a neck area which is different from a neck area of the locking Helmholtz resonator.

5. The duct as claimed in claim 1, wherein the damping Helmholtz resonators have a neck length which is different from a neck length of the locking Helmholtz resonator.

6. The duct as claimed in claim 1, wherein the one or more damping Helmholtz resonators have a resonance frequency which is approximately 10% smaller, or 10% larger, than a resonance frequency of the locking Helmholtz resonator.

7. The duct as claimed in claim 1, wherein the locking Helmholtz resonator and/or the one or more Helmholtz resonators are adjustable to vary their resonance frequency.

8. The duct as claimed in claim 1, further comprising one or more additional locking Helmholtz resonators.

9. The duct as claimed in claim 8, wherein the one or more additional locking Helmholtz resonators are tuned to the first frequency.

10. The duct as claimed in claim 8, wherein the one or more additional locking Helmholtz resonators are tuned to frequencies which are different from the first frequency.

11. The duct as claimed in claim 10, wherein the frequencies of the one or more additional locking Helmholtz resonators are different from the second frequency.

12. The duct as claimed in claim 11, wherein the one or more damping Helmholtz resonators have a volume which is 10% larger than the volume of the locking Helmholtz resonator and a volume which is 10% smaller than a volume of the one or more additional locking Helmholtz resonators.

13. The duct as claimed in claim 8, wherein the one or more additional locking Helmholtz resonators are positioned on the circumference of the duct at or adjacent to 180 degrees from the locking Helmholtz resonator.

14. The duct as claimed in claim 1, wherein the duct is an annular combustion chamber for a turbomachine, an industrial furnace or a boiler.

15. A turbomachine comprising the duct as claimed in claim 1.

16. A method of damping pressure waves in a duct caused by thermoacoustic instability, the method comprising:
positioning a locking Helmholtz resonator on a circumstance of the duct, the locking Helmholtz resonator being tuned to a first frequency:
positioning one or more damping Helmholtz resonators on the circumference of the duct:
at 90 degrees and/or 270 degrees from the locking Helmholtz resonator, or
adjacent to 90 degrees and/or 270 degrees from the locking Helmholtz resonator, the one or more damping Helmholtz resonators being adjacent to 90 degrees and/or 270 degrees from the locking Helmholtz resonator include: (i) a pair of damping Helmholtz resonators positioned at either side of 90 degrees, and/or (ii) a pair of damping Helmholtz resonators positioned at either side of 270 degrees; and
tuning the damping Helmholtz resonators to a second frequency different from the first frequency of the locking Helmholtz resonator.

17. A duct comprising:
a locking Helmholtz resonator positioned on a circumference of the duct, the locking Helmholtz resonator being tuned to a first frequency;
one or more damping Helmholtz resonators tuned to a second frequency different from the first frequency of the locking Helmholtz resonator, the one or more damping Helmholtz resonators being positioned on the circumference of the duct:
at 90 degrees and/or 270 degrees from the locking Helmholtz resonator, or
adjacent to 90 degrees and/or 270 degrees from the locking Helmholtz resonator, the one or more damping Helmholtz resonators being adjacent to 90 degrees and/or 270 degrees from the locking Helmholtz resonator include: (i) a pair of damping Helmholtz resonators positioned at either side of 90 degrees, and/or (ii) a pair of damping Helmholtz resonators positioned either side of 270 degrees; and
one or more additional locking Helmholtz resonators tuned to frequencies different from the first frequency and the second frequency, the one or more damping Helmholtz resonators having a volume being: (i) 10% larger than the volume of the locking Helmholtz resonator, and (ii) 10% smaller than the volume of the additional locking Helmholtz resonator, the one or more additional locking Helmholtz resonators being positioned on the circumference of the duct at or adjacent to 180 degrees from the locking Helmholtz resonator.

* * * * *